United States Patent

[11] 3,583,715

| [72] | Inventor | Eric Jahrl<br>25-29, Idrottsvagen, Orebro, Sweden |
|---|---|---|
| [21] | Appl. No. | 759,561 |
| [22] | Filed | Sept. 13, 1968 |
| [45] | Patented | June 8, 1971 |
| [32] | Priority | Sept. 15, 1967 |
| [33] | | Sweden |
| [31] | | 12,733/67 |

[54] QUICK CHANGE CHUCK
13 Claims, 9 Drawing Figs.

[52] U.S. Cl. .................................. 279/75, 279/82, 279/89
[51] Int. Cl. ..................................... B23b 31/22
[50] Field of Search ........................... 279/75, 82, 89

[56] References Cited
UNITED STATES PATENTS

| 1,353,299 | 9/1920 | Wilson | 279/75 |
| 2,481,945 | 9/1949 | Panyard | 279/82 |
| 2,970,844 | 2/1961 | Better | 279/75 |

FOREIGN PATENTS

| 115,467 | 12/1945 | Sweden | 279/75 |

*Primary Examiner*—Andrew R. Juhasz
*Assistant Examiner*—Donald D. Evenson
*Attorney*—Sommers and Young

ABSTRACT: This invention relates to a quick change chuck comprising locking means of pins or roller bodies adapted to engage in grooves in a collet, which is intended to be received in a preferably inwardly conically tapering opening within a sleeve in the chuck, which sleeve includes the locking bodies adapted to be locked in locking position by an outer sleeve movably placed on the outside of the chuck sleeve. The invention further relates to a locking device for locking the movable outer sleeve.

A chuck of similar type is previously known, at which the locking bodies are adapted to be locked in locking position in relation to the collet by means of an intermediate sleeve placed on the chuck sleeve, which intermediate sleeve is moved into and out of locking position by an outer sleeve cooperating with locking bodies in the intermediate sleeve for moving and locking the same, said intermediate sleeve being provided with members for locking the locking bodies of the collet. The locking bodies for the collet engage in a groove made in the surface of the collet which preferably is given an incline.

Chucks of the described kind have the object to render possible, also at rotating chuck, an exchange of the collet, which usually holds a tool or the like. The known embodiment, though rendering possible a rapid and reliable locking even at the rotation of the tool, involves certain disadvantages. At a very rapid rotation, for example, it can happen that the chuck does not lock. The incline of the groove in the collet at the known embodiment is intended to effect a self-tightening of the collet in the conical opening of the chuck sleeve in such a manner, that the collet, which by the resistance in operation is turned, is pressed further down into the opening by help of the inclined groove. At screw cutting, for example, when the tap is to be screwed out of the workpiece, the collet will be turned loose from its engagement in the opening and have too much play. This known embodiment of the collet and chuck locking means, thus, is less adapted for use at certain operations.

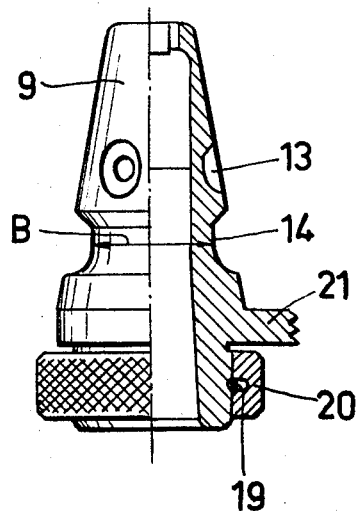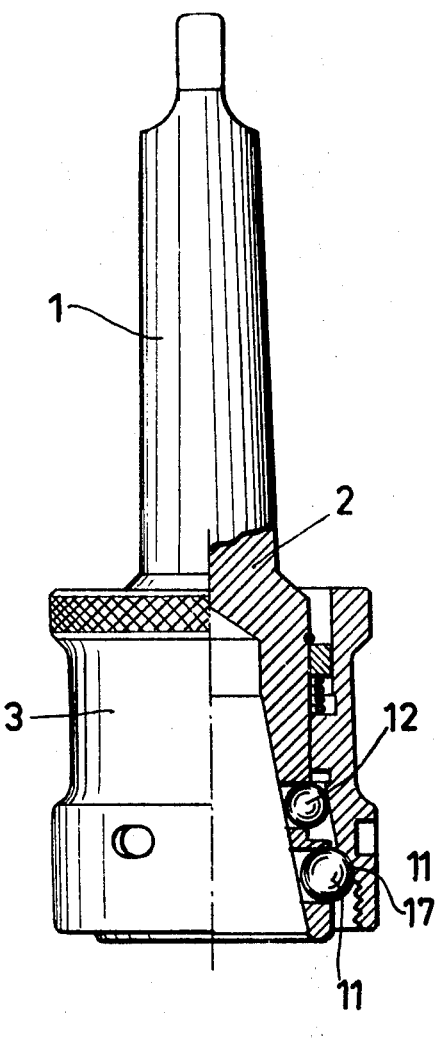

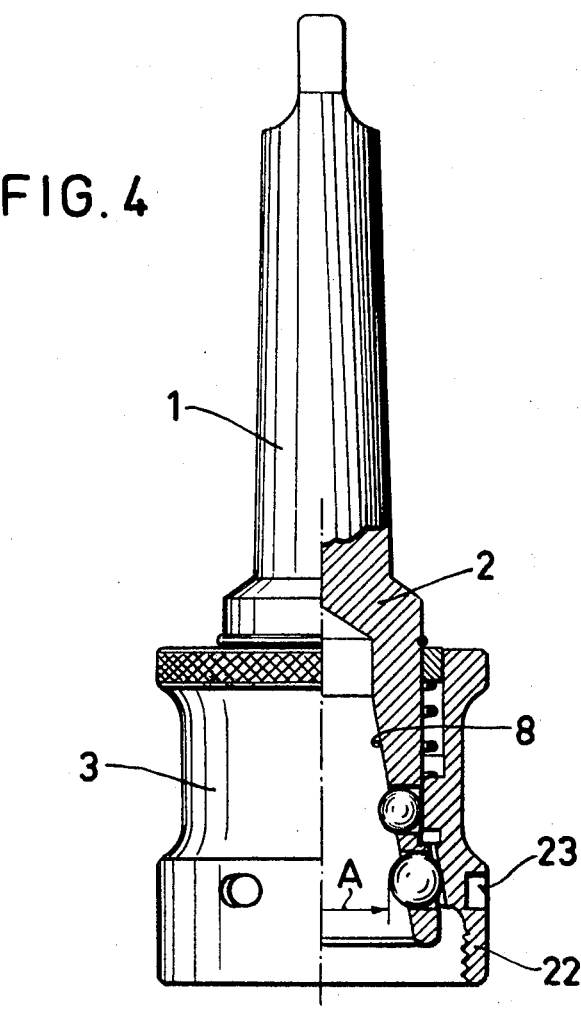

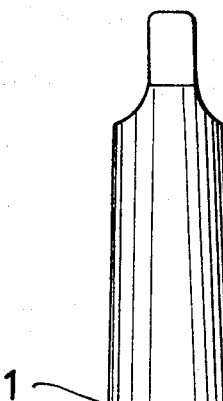
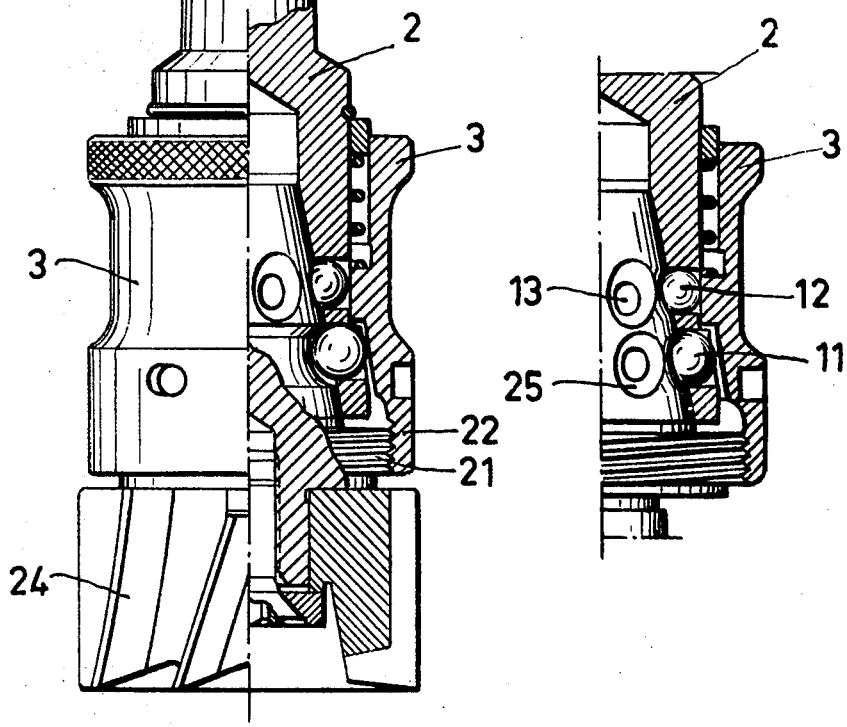

ERIC JAHRL — Inventor
Sommers + Young — Attorneys

QUICK CHANGE CHUCK

The present invention has as its object to eliminate the said disadvantages at the known embodiment and, moreover, to improve quick change chucks of this kind.

This is achieved in that the quick change chuck according to the invention is given the characterizing features defined in the claims.

Some embodiments of the chuck will be described in the following in connection with the drawings. FIG. 1 shows the chuck with mounted collet, half of the FIG. being shown in a section. FIG. 2 shows the collet, the right-hand portion of the FIG. showing one embodiment in a section, and the left-hand portion showing another embodiment of the collet in a view. FIG. 3 shows the chuck without collet, partially in a section, when the locking bodies are free. FIG. 4 shows the same view as FIG. 3 with the locking bodies in locking position. FIG. 5 shows the chuck in an embodiment with mounted milling tool. FIG. 6 shows a section through a portion of the chuck in a changed embodiment. FIG. 7 shows an embodiment of the chuck, partially in a section, the movable outer sleeve being provided with a locking device. FIG. 8 shows a partial section through the locking device in FIG. 7. FIG. 9 shows the locking device in a slightly altered embodiment.

In the different FIGS. those parts being common to and unchanged in the different FIGS. are given the same reference numbers.

The chuck shown in FIG. 1 shows a shank 1 for mounting in a machine tool, the lower end portion of the shank being designed in one piece with or carrying a sleeve 2. Around sleeve 2 is mounted an outer sleeve 3 in slidable and rotatable relationship with sleeve 2. At its rear end facing towards the shank 1 the outer sleeve 3 is given a greater diameter, so that between the sleeves 2 and 3 a recess 4 is formed, in which a spring 5 is placed, which presses the sleeve 3 in the forward direction. The spring 5 is locked by a stop ring 6 and locking ring 7, of which the latter is laid into a groove in the sleeve 2. The forward movement of the sleeve can be limited by a shoulder or the like in the chuck sleeve 2. The chuck sleeve 2 is provided with an inwardly conically tapering opening 8, see also FIGS. 3 and 4, for receiving the collet 9 (FIG. 2) which is also provided with a corresponding cone. The collet 9 may be a tool holder, a drill chuck, a turning center or the like, and in the embodiment shown (FIG. 1) it holds a drill 10.

The locking device comprises two sets of locking bodies, in the embodiment shown. Balls 11 and 12 in a spaced arrangement in the axial direction of the chuck, an so placed in the chuck sleeve 2 that, in locking position, they project with a portion of their circumference into the conical opening 8, but cannot pass through their seats in the sleeve 2 into the opening 8. The one set of balls 12 is adapted to engage in recesses 13 (FIG. 2) so formed in the collet that they lock the collet stiffly against torsional forces to the sleeve 2. The balls 12 are locked in locking position by a shoulder 16 in the outer sleeve 3. The other set of balls 11 is adapted to cooperate by its inner ball race with the edge of recesses (FIG. 6) or a groove 14 (FIG. 2) extending around the circumference of the collet, in such a manner, that an internal conical guide surface 15 in the sleeve 3 cooperates with the outer ball race of the balls 11 and presses the balls 11 by help of the spring force 5 inwards at the same time as the balls are effected to perform a rotation whereby the collet 9 is pressed inwardly into the conical opening 8 in the chuck. The arrangement shown is constructively advantageous, but also other distributions of the locking bodies can be imagined within the scope of the invention.

In FIG. 3 the locking device is shown in its released position, i.e. the sleeve 3 is drawn back. For the sake of clarity, the collet is not shown. In FIG. 4 the locking device is shown in the same view as in FIG. 3, but in locking position, i.e. the sleeve 3 is pressed forward by the force of spring 5. It appears from FIG. 3 that the balls 12 are slightly smaller in diameter than the balls 11, so that when the sleeve 3 is drawn back, the balls 11 can move freely outwards within the guide surface 15. It is, of course, also possible that the locking balls have the same size, or even that the balls 12 are of a greater size, and that a special recess is made in the sleeve 3, axially between the shoulder 16 and the guide surface 15, for receiving the balls 12 in the released position. The balls 11 are received at the released position in a recess 17 before the guide surface 15. FIG. 4 also shows how the balls 11 are pressed inwards by the conical guide surface 15 at the same time as the balls 12 are locked by the shoulder 16 in locking position. The diameter of the innermost ball race of the balls 11 must be smaller than the diameter B of the groove 14 in the collet (FIG. 2), so that the balls 11 resiliently press against the edges of the groove, preferably against the inner edge of the groove 14 (FIG. 1). By this arrangement compensation is made for a possible wear of the surfaces. For preventing the balls 12 from impeding the balls 11 to press the collet inwards into the opening 8, the recesses 13 in the collet 9 are oblong in axial direction (see FIGS. 1 and 2).

The function of the locking device is substantially evident from the above description and it will be described in the following only comprehensively. When the collet is to be mounted in the chuck, the sleeve 3 is drawn upwards against the force of spring 5, whereby the collet 9 can be inserted and push aside the balls (FIG. 3). Thereafter the sleeve 3 is released whereby it springs forward and presses the balls 11, 12 into the recesses 13 and 14 respectively. Thereby the collet is locked stiff against torsion to the chuck by the one ball set 12 whilst the other ball set 11 in the manner described presses the collet inwards into the conical opening 8. The sleeve 3 preferably is provided with grooved beads 18 serving as a grip. On the collet 9 a holding ring 20 is mounted by a locking ring 19 and ring 20 is adapted to be rotated in relation to the collet. The ring 20 may also be grooved.

For effecting, in extreme cases, an additional locking of the collet, the collet may further be provided with a threaded flange 21 as shown in the right-hand half of FIG. 2. The sleeve 3 thereby is provided with a corresponding nut thread on a flange 22 (FIGS. 3 and 4). In mounting the collet, it is inserted into the opening in the chuck sleeve 2—the sleeve 3 is drawn back—and the sleeve 3 is screwed down over the collet, whereby the collet is locked both by the locking device and by the threads 21, 22. For tightening the sleeve 3 on the collet 9, the sleeve is provided with recesses 23 into which a suitable tool can be fitted.

FIG. 5 shows as an example of the arrangement of the kind described last the mounting of a milling tool 24 into the chuck, the tool being locked both by the locking device and the threads 21, 22.

FIG. 6 shows an altered embodiment of the locking device according to the invention, in which the balls 11 also engage in recesses 25.

In those cases when the balls engage in recesses in the collet, the number of recesses preferably exceeds the number of balls, for example three balls and six recesses, whereby a more rapid and safer engagement is achieved. The number of recesses is only limited by the fact that there must remain sufficient material between the recesses in order to allow for the desired locking of the collet.

Figure 1:
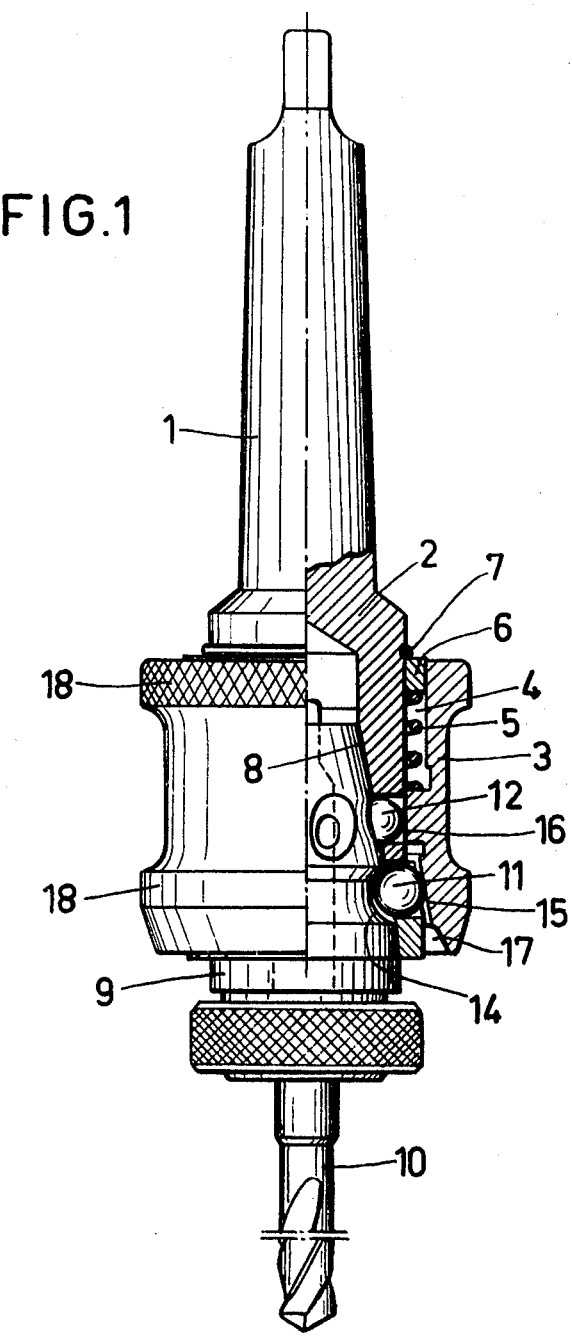
Figure 7:
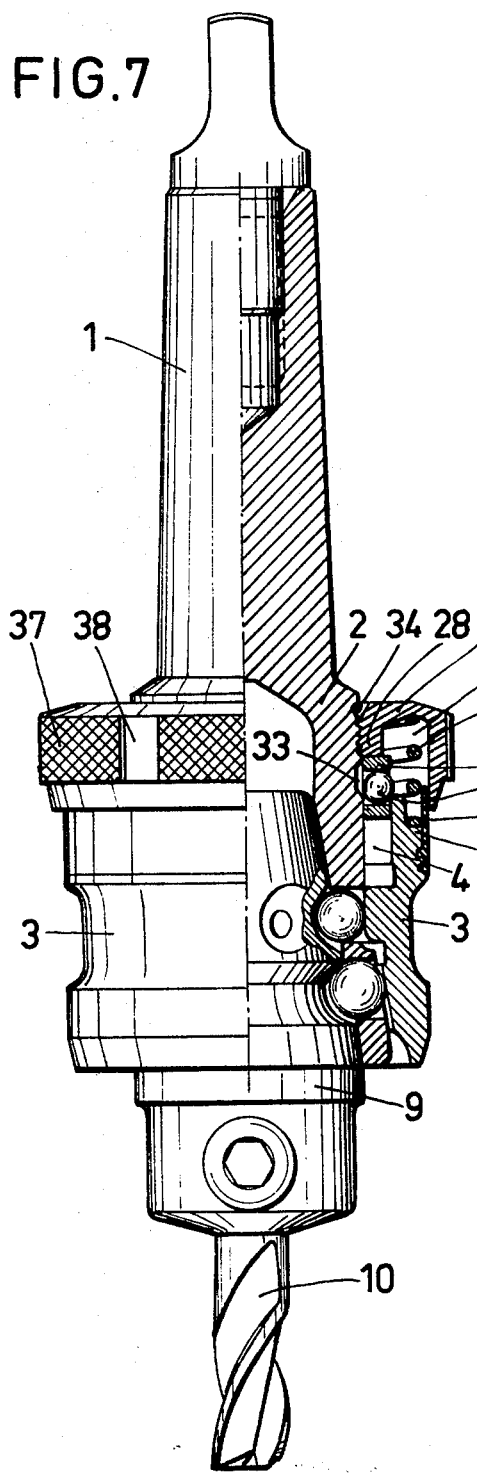
Figure 8:
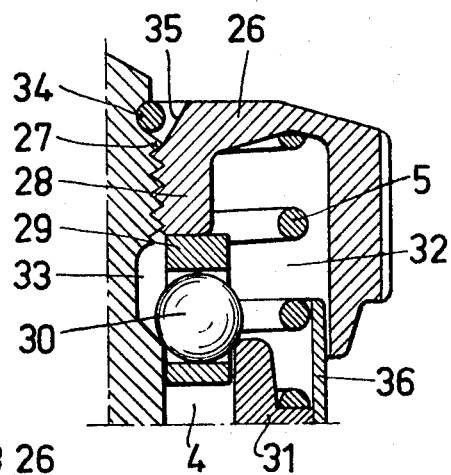
Figure 9:
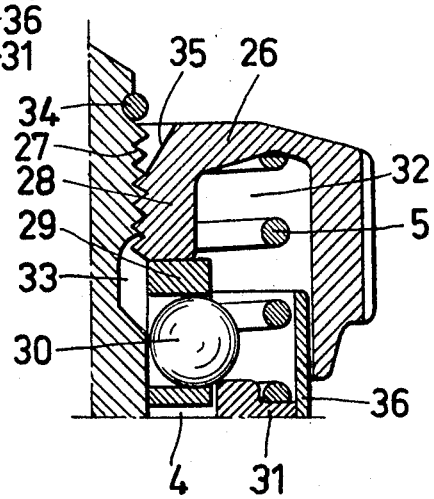

For certain applications, the outer sleeve 3 can be moved due to vibrations from the locking position against the spring force 5. The same can happen when the chuck is being applied in turrets with rapid shift motions whereby the sleeve 3 is exposed to forces tending to displace the sleeve, so that the tool is loosened. For preventing this, according to the invention, a locking device for the outer sleeve 3 is provided, as shown in FIGS. 7—9. The locking device comprises a nut 26 threaded 27 on the outside of the chuck sleeve 2 behind the outer sleeve 3 and spaced thereto. In said space, between a projection 28 on the nut 26 and the sleeve 3 is mounted a ball holder ring 29 with a number of balls 30 divided around the circumference. The ring 29 fits with clearance into the recess 4 between the chuck sleeve 2 and the outer sleeve 3 and it is displaceable therein, the diameter of the balls being greater than the width of the recess 4. In this embodiment the spring 5 is placed on the outside of the outer sleeve 3 against a shoulder 31 and is received in a depression 32 in the nut. A groove 33 in the circumference of the chuck sleeve is adapted to receive the balls 30 when the nut 26 is being screwed back. The groove has such a depth that the outer sleeve 3 can pass over the balls 30 when they are located in the groove. The screwing back of the nut 26 is limited by a locking ring 34 on the chuck sleeve 2, which ring cooperates with an inner conical surface 35 on the nut 26 when the nut is in the position where it is entirely screwed back, and by friction retains the nut 26 is said position.

The function of the device described is as follows. When the nut 26 is screwed forward (FIGS. 7—9) the balls 30 are pressed by the projection 28 on the nut against the end of the outer sleeve 3 whereby the balls either abut to the edge of the groove 33 and the suitably bevelled end of the outer sleeve 3 (FIG. 8), or the balls 30 lying entirely outside of the groove 33 on the circumference of the chuck sleeve 2 abut the end of the outer sleeve 3 (FIG. 9). When the outer sleeve 3 is to be drawn back for exchanging the collet 9, the nut 26 is turned back. The pitch of the nut is so chosen that the turning through one quarter to one half of a revolution is sufficient to enable the balls 30 to move aside in the groove 33, so that the outer sleeve passes outside of the balls 30 to the free position.

When the locking device is not to be used at all, however, the nut is screwed back several turns until the surface 35 meets the locking ring 34, whereby the nut 26 is retained in this position by frictional engagement between the ring 34 and surface 35.

The nut, as mentioned, preferably is provided with a depression 32 for receiving the spring 5 and possibly the end of the outer sleeve 3, when the latter is being displaced. Thereby also the mass of the nut 26 is reduced, so that the nut is not affected as easily by violent movements of the chuck. On the outer sleeve 3 is fastened a thin flange 36 of metal, plastics etc. adapted to slide against the inner surface of the depression 32 for effecting outward sealing of the locking device. The nut 26 preferably is channelled 37 and provided with grooves 38 on the outside for facilitating its turning by hand or with a tool.

The invention, of course, is not restricted to the embodiments shown, but alterations and modifications of these embodiments can be made. Thus, more than two sets of locking bodies may be arranged, and the locking bodies also may be roller elements other than balls. The locking bodies need neither be placed in groups of symmetric division, as shown in the drawing, though such an arrangement offers constructive advantages. At a nonrotatable outer sleeve other arrangements can be imagined, such as alternatingly locking and resilient locking bodies around the same circumference of the sleeve or also spread over the inner surface of the sleeve.

I claim:
1. A quick-change chuck comprising in combination:
an inner sleeve having an axial opening with a single conical bearing surface,
a collet adapted to fit in said opening in said inner sleeve and having a conical surface which tapers at the same angle as said single conical surface on said sleeve, the only point of direct contact between said collet and said sleeve when said collet is fully inserted into said inner sleeve being along said conical surface on said collet which bears against said single conical bearing surface on said inner sleeve,
a unitary outer sleeve encircling said inner sleeve and also at least a portion of said collet and being axially movable between collet-locking and unlocking positions,
spring means normally urging said outer sleeve to its said collet-locking position,
a plurality of locking bodies circumferentially disposed in the wall of said inner sleeve between said collet and said outer sleeve and in the region of said single conical bearing surface,
a plurality of discrete recesses in said collet for receiving said locking bodies,
means on said outer sleeve effective only when said outer sleeve is in its said collet-locking position for urging each said locking body into a respective one of said discrete recesses for locking said collet rotationally relative to said inner sleeve,
and a second locking means also disposed between said collet and said outer sleeve and operative only when said outer sleeve is in its collet-locking position for urging said collet fully into said opening of said inner sleeve to bring the respective conical surfaces on said inner sleeve and said collet into pressured contact.

2. The quick-change chuck of claim 1 in which said second locking means also comprises a plurality of second locking bodies and at least one additional conical surface on said collet extending outwardly in the direction of entry of said collet into said opening,
and means on said outer sleeve effective when said outer sleeve is in its said collet-locking position for urging said second locking bodies against said additional conical surface to thereby urge said collet tightly into said axial opening of said outer sleeve.

3. The quick-change chuck of claim 2 in which the inner surface of said outer sleeve has at least one annular surface parallel to the axis of said collet and longitudinally disposed to force said first locking bodies into respective ones of said recesses when said outer sleeve is in its said collet-locking position, said inner surface of said outer sleeve having also at least one conical surface disposed to urge said second locking bodies against said conical surface on said collet when said outer sleeve is in its collet-locking position.

4. The quick-change chuck of claim 2, characterized in that the first and the second sets of locking bodies are spaced axially in two groups, the locking bodies in every group being located on the same circumference of said inner sleeve.

5. The quick-change chuck of claim 3 in which said locking bodies are balls, the balls of said first locking means having a smaller diameter than the balls of said second locking means, the balls of said first locking means being located axially relative to the balls of said second locking means in the direction of collet insertion, the balls of said first locking means being adapted to lie directly opposite said inner conical surface of said outer sleeve when said outer sleeve is axially moved to its collet unlocking position, whereby the balls of said first locking means can move aside from said recesses in said collet, said outer sleeve further having recesses which lie directly opposite the balls of said second locking means when said outer sleeve is in its collet unlocking position.

6. The quick-change chuck of claim 2 in which said outer sleeve is mounted rotatably in relation to said inner sleeve, the inner surface of said outer sleeve having at least one cylindrical surface parallel to its axis which bears against a mating cylindrical surface on said collet.

7. The quick-change chuck of claim 2, said locking bodies of said first locking means engaging in axially elongated recesses in the surface of said collet, the locking bodies of said second locking means bearing against the edge of an annular recess of the collet.

8. The quick-change chuck of claim 7 which further includes means for securing said outer sleeve directly to said collet.

9. The quick-change chuck of claim 1, in which the number of said recesses exceeds the number of said locking bodies in said first locking means.

10. A quick-change chuck comprising in combination:
an inner sleeve having a tapered axial opening,
a collet adapted to fit into said opening,
an outer sleeve encircling said inner sleeve and also at least a portion of said collet and being axially movable between collet-locking and collet-unlocking positions,
means normally urging said outer sleeve to its said collet-locking position,
a first locking means disposed between said collet and said outer sleeve and operative only when said outer sleeve is in its collet-locking position for locking said collet rotationally relative to said inner sleeve, a second locking means also disposed between said collet and said outer sleeve and operative only when said outer sleeve in its collet-locking position for urging said collet into said opening of said inner sleeve, a nut threaded to said inner sleeve and movable axially therealong between outer sleeve locking and unlocking positions, a plurality of circumferentially spaced sleeve locking balls axially disposed between said nut and the upper end of said outer sleeve, said inner sleeve being spaced from the inner surface of said outer sleeve by an amount less than the diameter of said sleeve locking balls, said nut in its locking position urging said sleeve locking balls against the upper end of said outer sleeve to thereby prevent movement of said outer sleeve to its collet-unlocking position, said inner sleeve defining at least one recess for receiving said sleeve locking balls, said nut in its unlocking position permitting entry of said balls into said inner sleeve recess to thereby permit movement of said outer sleeve to its collet-unlocking position.

11. The quick-change chuck of claim 10 in which a lock ring on the circumference of said inner sleeve limits movement of said nut, said ring cooperating with a conical surface on said nut and locking said nut by friction in the position where the nut is entirely screwed back to unlock said outer sleeve.

12. The quick-change chuck of claim 10 in which said nut is provided with a depression for receiving the end of said outer sleeve upon its movement to said collet unlocking position, a flange between said outer sleeve and said nut, said flange being fastened to one of said outer sleeve and nut and movable in the other for sealing the space between the nut and said outer sleeve.

13. The quick-change chuck of claim 12 in which said means normally urging said outer sleeve to said collet locking position comprises a coil spring positioned in said depression.